US009490636B2

(12) United States Patent
Haraguchi (10) Patent No.: US 9,490,636 B2
(45) Date of Patent: Nov. 8, 2016

(54) POWER SUPPLY CIRCUIT, POWER SUPPLY METHOD AND POWER SUPPLY SYSTEM

(75) Inventor: Hirotsugu Haraguchi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 720 days.

(21) Appl. No.: 13/992,673

(22) PCT Filed: Dec. 8, 2010

(86) PCT No.: PCT/JP2010/007155
§ 371 (c)(1),
(2), (4) Date: Jun. 7, 2013

(87) PCT Pub. No.: WO2012/077165
PCT Pub. Date: Jun. 14, 2012

(65) Prior Publication Data
US 2013/0249288 A1 Sep. 26, 2013

(51) Int. Cl.
*H02J 4/00* (2006.01)
*H02J 7/35* (2006.01)
*H02J 7/00* (2006.01)

(52) U.S. Cl.
CPC ............... *H02J 4/00* (2013.01); *H02J 7/0068* (2013.01); *H02J 7/35* (2013.01); *Y10T 307/344* (2015.04)

(58) Field of Classification Search
CPC ................... H02J 7/0068; Y10T 307/344
See application file for complete search history.

(56) References Cited

U.S. PATENT DOCUMENTS

| 5,781,422 A * | 7/1998 | Lavin | H02J 9/061 307/64 |
|---|---|---|---|
| 6,359,459 B1 * | 3/2002 | Yoon | G01R 31/40 324/762.01 |
| 7,346,444 B2 * | 3/2008 | Mitani | H02J 7/345 180/117 |
| 7,479,771 B2 * | 1/2009 | Ryu | H02M 3/156 323/271 |
| 8,129,862 B2 * | 3/2012 | Audy | H02J 1/10 307/80 |
| 2006/0164040 A1 * | 7/2006 | Ohkubo | G06F 1/30 320/135 |

(Continued)

FOREIGN PATENT DOCUMENTS

| JP | 2-280634 | 11/1990 |
| JP | 7-312833 | 1/1995 |
| JP | 2005-149920 | 6/2005 |

(Continued)

OTHER PUBLICATIONS

International Search Report dated Mar. 15, 2011.

*Primary Examiner* — Thienvu Tran
*Assistant Examiner* — Pinping Sun
(74) *Attorney, Agent, or Firm* — Dickinson Wright PLLC (57) ABSTRACT

A power supply circuit supplies power to a load from a main power source or an auxiliary power source. The power supply circuit includes a hybrid selection unit that selects one of the main power source and the auxiliary power source and supplies power to the load from the selected one, a voltage comparing unit that compares a voltage of the main power source and a voltage of the auxiliary power source, and a power source control unit that controls the auxiliary power source in accordance with a comparison result of the voltage comparing unit, and supplies a voltage higher than the voltage of the main power source by a predetermined voltage to the load from the auxiliary power source through the hybrid selection unit.

12 Claims, 6 Drawing Sheets

(56) References Cited

U.S. PATENT DOCUMENTS

2008/0084117 A1* 4/2008 Sander ............... H02J 7/35
  307/46
2009/0228727 A1* 9/2009 Tamura ............. G06F 1/3203
  713/320
2010/0309690 A1* 12/2010 Kawabe ........... H02M 3/33507
  363/21.01
2011/0140527 A1* 6/2011 Choi .................. H02J 7/35
  307/76

FOREIGN PATENT DOCUMENTS

| | | |
|---|---|---|
| JP | 2006-204024 | 8/2006 |
| JP | 2009-148064 | 7/2009 |

\* cited by examiner

POWER SUPPLY CIRCUIT, POWER SUPPLY METHOD AND POWER SUPPLY SYSTEM

TECHNICAL FIELD

The present invention relates to a power supply circuit, a power supply method and a power supply system.

BACKGROUND ART

In recent years, for use in such equipment as street lamps, surveillance cameras, and unmanned communications stations that are used in a situation that battery replacement cannot be done frequently, power supply systems which supply power to a load through cooperation between a main power source such as a backup built-in battery and an auxiliary power source such as a fuel cell or a solar cell have come to attract attention.

Such power supply systems are equipped with, as an auxiliary power source, a power source for supplying power to a load while suppressing the consumption of power supplied from a main power source. In many of such power supply systems, the auxiliary power source not only supplies power to the load but also stores excess power in a power storage unit (e.g., a lithium ion battery).

Electronic apparatus are known which are equipped with, as a power source unit, a main power source and an electric generator for an auxiliary power source and requires almost no battery replacement (refer to Patent Literature 1, for example).

CITATION LIST

Patent Literature

Patent Literature 1: P-A-2006-204024

SUMMARY OF INVENTION

Technical Problem

As described above, conventional power supply systems are convenient because the consumption of power supplied from the main power source is suppressed and its battery life is elongated in a case where the main power source and the auxiliary power source are connected to the load. However, since the auxiliary power source is used with preference over the main power source, it is necessary that the voltage setting value of the auxiliary power source be larger than that of the main power source. In particular, since the voltage of the main power source fluctuates, the voltage setting value of the auxiliary power source is made larger than that of the main power source with a sufficient margin. This means a problem that the power of the auxiliary power source is consumed uselessly by an amount corresponding to the voltage margin.

The present invention has been made in the above circumstances, and an object of the present invention is therefore to provide a power supply circuit, a power supply method and a power supply system which can prevent unnecessary consumption of power supplied from an auxiliary power source while suppressing the consumption of power supplied from a main power source efficiently.

Solution to Problem

A power supply circuit according to an aspect of the present invention is a power supply circuit, which supplies power to a load from a main power source or an auxiliary power source, the power supply circuit including: an energy storage unit for storing power that is supplied from the auxiliary power source; a voltage comparing unit that compares a voltage of the main power source and a voltage of the energy storage unit; a power source control unit that controls power supply from the auxiliary power source to the energy storage unit; and a hybrid selection unit that selects one of the main power source and the energy storage unit and supplies power to the load from the selected one, wherein the power source control unit suspends supply of power from the auxiliary power source to the energy storage unit in accordance with a comparison result of the voltage comparing unit.

With this configuration, the energy storage unit, that is, the auxiliary power source, can be selected if the voltage of the energy storage unit has become higher than the voltage of the main power source such as a battery because of supply of power from the auxiliary power source. And, during that period, the supply of power from the auxiliary power source to the energy storage unit can be suspended. Therefore, unnecessary consumption of power supplied from an auxiliary power source can be prevented while the consumption of power supplied from the main power source is suppressed efficiently.

A power supply circuit according to an aspect of the present invention is a power supply circuit which supplies power to a load from a main power source or an auxiliary power source, the power supply circuit including: an energy storage unit for storing power that is supplied from the auxiliary power source; a voltage comparing unit that compares a voltage of the main power source and a voltage of the energy storage unit successively; a power source control unit that controls power supply from the auxiliary power source to the energy storage unit; and a hybrid selection unit that selects one, having a higher voltage, of the main power source and the energy storage unit and supplies power to the load from the selected one, wherein the power source control unit suspends supply of power from the auxiliary power source to the energy storage unit during a period when the voltage comparing unit determines that the voltage of the energy storage unit is higher than the voltage of the main power source by a predetermined voltage or more.

With this configuration, the energy storage unit, that is, the auxiliary power source, is selected if the voltage of the energy storage unit has become higher than the voltage of the main power source because of supply of power from the auxiliary power source. And, during that period, the supply of power from the auxiliary power source to the energy storage unit is suspended. Therefore, unnecessary consumption of power supplied from an auxiliary power source can be prevented while the consumption of power supplied from the main power source is suppressed efficiently.

The power supply circuit according to an aspect of the present invention is a power supply circuit, wherein a resistor unit is provided in a wiring line which connects the voltage comparing unit and the energy storage unit, the resistor unit having a predetermined resistance for securing a voltage difference between the voltage of the main power source and the voltage of the energy storage unit which are compared by the voltage comparing unit.

With this configuration, even in the case where the voltage of the main power source fluctuates to a large extent and hence the hybrid selection unit cannot exercise its function sufficiently though the auxiliary power source can generate a sufficient amount of power, that is, the frequency of events that the voltage of the main power source becomes higher than that of the energy storage unit is high and the consumption of power supplied from the main power source is large, by virtue of the addition of the resistor unit such a voltage difference that the voltage of the energy storage unit is higher than that of the main power source can be secured. This assures stable operations.

A power supply circuit according to an aspect of the present invention is a power supply circuit which supplies power to a load from a main power source or an auxiliary power source, the power supply circuit including: an energy storage unit for storing power that is supplied from the auxiliary power source; a first voltage comparing unit that compares a voltage of the main power source and a voltage of the energy storage unit successively; a power source control unit that controls power supply from the auxiliary power source to the energy storage unit; a hybrid selection unit that selects one, having a higher voltage, of the main power source and the energy storage unit, and supplies power to the load from the selected one; a reference voltage unit that holds a minimum voltage that is necessary for the load; and a second voltage comparing unit that successively compares a power source voltage selected by the hybrid selection unit with the voltage of the reference voltage unit, wherein the power source control unit suspends supply of power from the auxiliary power source to the energy storage unit during a period when the first voltage comparing unit determines that the voltage of the energy storage unit is higher than the voltage of the main power source by a predetermined voltage or more and the second voltage comparing unit determines that the selected power source voltage is higher than the voltage of the reference voltage unit.

With this configuration, a minimum necessary amount of power can be output as long as the auxiliary power source can produce an electromotive force even if the voltage of the main power source has become lower than or equal to the voltage of the reference voltage unit.

A power supply method according to an aspect of the present invention is a power supply method for supplying power to a load from a main power source or an auxiliary power source, the power supply method including: a voltage comparing step of successively comparing a voltage of the main power source and a voltage of an energy storage unit for storing power that is supplied from the auxiliary power source; a power source control step of controlling power supply from the auxiliary power source to the energy storage unit; and a hybrid selection step of selecting one, having a higher voltage, of the main power source and the energy storage unit and supplying power to the load from the selected one, wherein the power source control step suspends supply of power from the auxiliary power source to the energy storage unit during a period when the voltage comparing step determines that the voltage of the energy storage unit is higher than the voltage of the main power source by a predetermined voltage or more.

With this constitution, the energy storage unit, that is, the auxiliary power source, is selected if the voltage of the energy storage unit has become higher than the voltage of the main power source because of supply of power from the auxiliary power source. And, during that period, the supply of power from the auxiliary power source to the energy storage unit is suspended. Therefore, unnecessary consumption of power supplied from an auxiliary power source can be prevented while the consumption of power supplied from the main power source is suppressed efficiently.

A power supply system according to an aspect of the present invention is a power supply system that includes a main power source, an auxiliary power source, and a power supply circuit for supplying power to a load from the main power source or the auxiliary power source, the power supply circuit including: an energy storage unit for storing power that is supplied from the auxiliary power source; a voltage comparing unit that compares a voltage of the main power source and a voltage of the energy storage unit successively; a power source control unit that controls power supply from the auxiliary power source to the energy storage unit; and a hybrid selection unit that selects one, having a higher voltage, of the main power source and the energy storage unit, and supplies power to the load from the selected one, wherein the power source control unit suspends supply of power from the auxiliary power source to the energy, storage unit during a period when the voltage comparing unit determines that the voltage of the energy storage unit is higher than the voltage of the main power source by a predetermined voltage or more.

With this configuration, the energy storage unit, that is, the auxiliary power source, is selected if the voltage of the energy storage unit has become higher than the voltage of the main power source because of supply of power from the auxiliary power source. And, during that period, the supply of power from the auxiliary power source to the energy storage unit is suspended. Therefore, unnecessary consumption of power supplied from an auxiliary power source can be prevented while the consumption of power supplied from the main, power source is suppressed efficiently.

Advantageous Effects of Invention

The present invention makes it possible to prevent unnecessary consumption of power supplied from an auxiliary power source while suppressing the consumption of power supplied from a main power source efficiently.

BRIEF DESCRIPTION OF DRAWINGS

FIGS. 1(a) and 1(b) illustrate example configurations of wireless intercommunication systems using an entrance slave unit which incorporates a power supply circuit according to a first embodiment of the present invention; FIG. 1(b) shows an installation example of the entrance slave unit in which a solar cell portion is separated from the entrance slave unit of FIG. 1(a).

MODES FOR CARRYING OUT INVENTION

Power supply circuits, power supply methods and power supply systems according to embodiments of the present invention will be hereinafter described with reference to the drawings.

Embodiment 1

Figure 1:
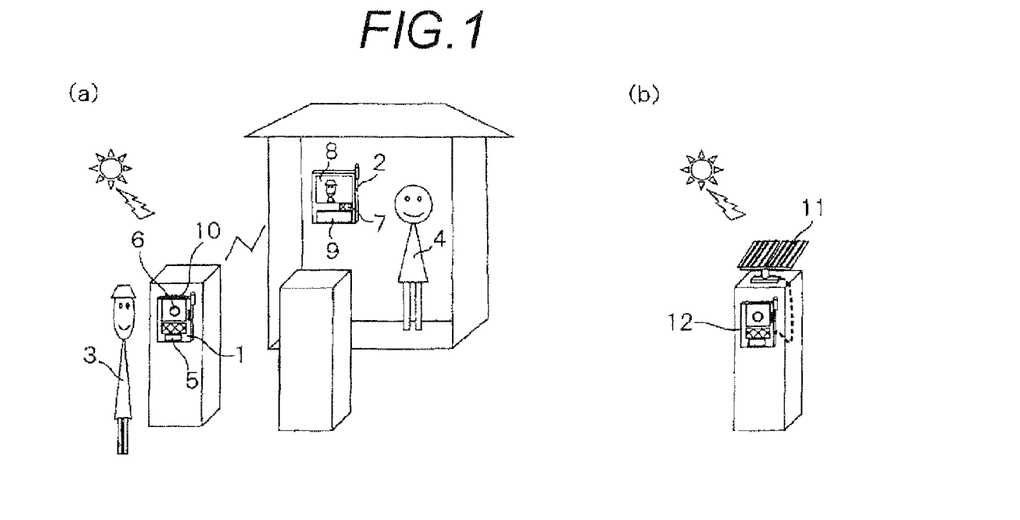

FIG. 1(a) illustrates an example configuration of a wireless intercommunication system using an entrance slave unit which incorporates a power supply circuit according to a first embodiment of the present invention. FIG. 1(b) shows an installation example of an entrance slave unit in which a solar cell portion is separated from the entrance slave unit of FIG. 1(a).

Referring to FIG. 1(a), the entrance slave unit 1 which is installed outdoors (e.g., attached to a gatepost) allows a visitor 3 to call or converse with a resident 4 by performing a wireless communication with an intercom master unit 2 which is installed indoors.

When a call button 5 of the entrance slave unit 1 is pushed by a visitor 3, the entrance slave unit 1 starts shooting the visitor 3 with a camera 6 and sends resulting video information and a call request to the intercom master unit 2 by radio. Receiving the call request, the intercom master unit 2 notifies the resident 4 of a visit from, the visitor 3 by outputting a call sound from a speaker 7 and displaying video information on a display unit 8. When a conversation button 9 is pushed by the resident 4, a wireless audio path is established between the intercom master unit 2 and the entrance slave unit 1, which makes it possible for the resident 4 to converse with the visitor 3. (A general wireless intercommunication system is disclosed in JP-A-11-136373, for example.)

A solar cell 10 is attached to a surface of the cabinet of the entrance slave unit 1, and the entrance slave unit 1 is supplied with power generated by the solar cell 10 under the control of a power control circuit 19 (described later). As shown in FIG. 1(b), the entrance slave unit 1 may be altered so as to be installed in the form of a set of an entrance slave unit 12 in which the solar cell 10 is not attached to a surface of its cabinet and the solar cell device 11 which is separate from the entrance slave unit 12.

Figure 2:
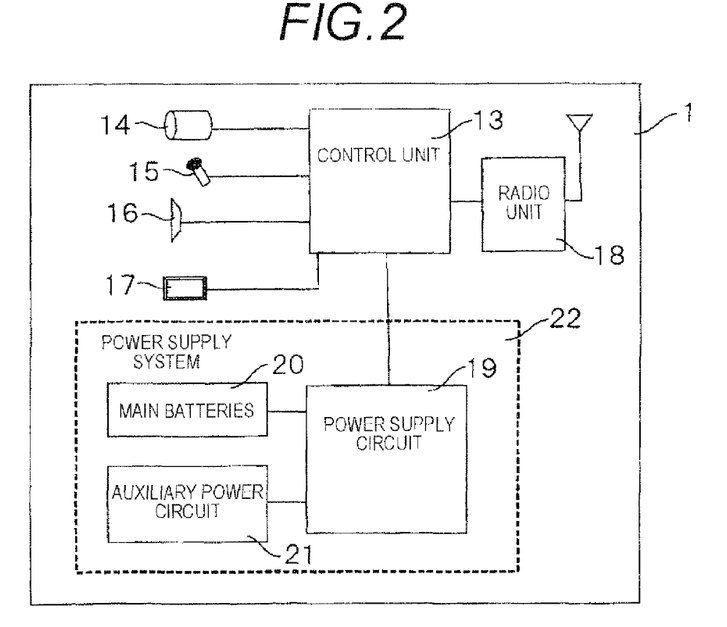
FIG. 2 is a block diagram showing an example internal configuration of the entrance slave unit 1 shown in FIGS. 1(a) and 1(b).

FIG. 2 is a block diagram showing an example internal configuration of the entrance slave unit 1 shown in FIG. 1(a). A control unit 13, which is, for example, an H8 one-chip microcontroller produced by Renesas Electronics Corporation, causes the entrance slave unit 1 to operate in the manner described above with reference to FIG. 1(a) by controlling such individual units as a camera input unit 14 which receives video information taken by the camera 6, a microphone 15 and a speaker 16 for voice input/output, a call detection unit 17 for detecting a push of the call button 5, and a radio unit 18 which performs a wireless communication with the intercom master unit 2. The entrance slave unit 1 is also equipped with the power control circuit 19 which is a characterizing feature of the first embodiment of the present invention and will be described later in detail and two power sources which output power to the power control circuit 19, that is, a main batteries 20 (corresponds to an example main power source) and an auxiliary power circuit 21 (corresponds to an example auxiliary power source). The auxiliary power circuit 21 uses, as a power source, the solar cell 10 which is described with reference to FIG. 1(a).

The above-mentioned control unit 13 is supplied with power from the main batteries 20 and the auxiliary power circuit 21 via the power control circuit 19, and causes the entrance slave unit 1 to operate. If the entrance slave unit 1 were an ordinary apparatus, it might be configured in such a manner that the power control circuit 19 is omitted and only the main batteries 20 are provided for supply of power. It would suffice to replace the main batteries 20 when they have run down. On the other hand, in such apparatus as the entrance slave unit 1 according to the embodiment which are installed outdoors in a fixed manner, the main batteries 20 cannot be replaced frequently. Therefore, in the entrance slave unit 1, it is necessary to suppress the consumption of power supplied from the main batteries 20 efficiently and hence power is also supplied from the auxiliary power circuit 21. The control by the power control circuit 19 according to the embodiment makes it possible to not only suppress the consumption of power supplied from the main batteries 20 efficiently but also suppress the consumption of power supplied from the auxiliary power circuit 21 to the limit.

In the following description, the power control circuit 19, the main batteries 20, and the auxiliary power circuit 21 are together called a power supply system (denoted by numeral 22 in the figure).

Figure 3:
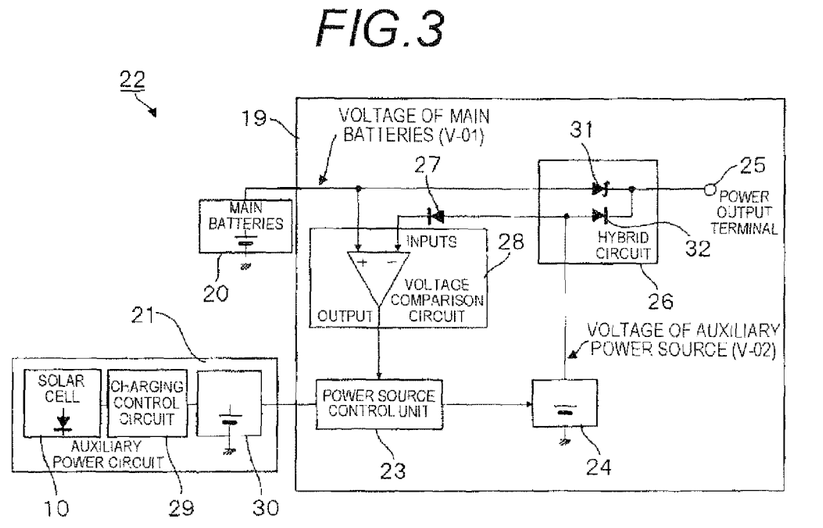
FIG. 3 is a block diagram showing an example hardware configuration of a power supply system according to the first embodiment of the present invention.

FIG. 3 is a block diagram showing an example hardware configuration of the power supply system according to the first embodiment of the present invention. As described with reference to FIG. 2, the power supply system 22 includes the power control circuit 19, the main batteries 20, and the auxiliary power circuit 21.

<Configuration of Power Supply System>

The power control circuit 19 includes a power source control unit 23 which turns on/off the supply of power from the auxiliary power circuit 21, an electric double-layer energy storage device 24 which stores power that is output from the power source control unit 23, a hybrid circuit 26 which selects one, having a higher voltage, of the main batteries 20 and the electric double-layer energy storage device 24 and supplies power to a power output terminal 25 from it, and a voltage comparison circuit 28 which compares the voltage of the main batteries 20 with a voltage that is obtained from the electric double-layer energy storage device 24 via an offset diode 27 and outputs a power supply on/off instruction to the power source control unit 23.

The main, batteries 20 are primary batteries such as alkaline batteries as used in ordinary apparatus. A necessary number of main batteries 20 are provided according to a load operating voltage, and are connected to the power control circuit 19 to supply their power.

The auxiliary power circuit 21 includes the solar cell 10 (described above with reference to FIG. 1(a)), a charging control circuit 29 such as a commonly known MPPT (maximum power point tracker) for extracting maximum energy from the solar cell 10, and a lithium ion battery 30 as a secondary battery for storing excess power. The auxiliary power circuit 21 is connected to the power control circuit 19 to supply its power.

Power that is supplied from the main batteries 20 or the auxiliary power circuit 21 in the power supply system 22 and output from the power control circuit 19 is supplied to the load (i.e., the control unit 13 of the entrance slave unit 1 (see FIG. 2)).

Techniques relating to the above-mentioned MPPT are disclosed in, for example, "Tokushu: taiyo denchi ouyou seisaku heno izanai dai 5 shou," [Special Topic: Invitation to Application and Manufacture of Solar cells, Chapter 5,] Transistor Gijutsu, 2005 September Issue, CQ Publishing Co., Ltd.

<Hybrid Circuit>

In the hybrid circuit 26, a Schottky diode 31 having the main batteries 20 as an input power source and a diode 32 having the auxiliary power circuit 21 (more accurately, the electric double-layer energy storage device 24 which stores power supplied from the auxiliary power circuit 21) as an input power source constitute an OR circuit. As a result, power is supplied to the power output terminal 25 from one, producing a higher one of the voltages appearing on the side of the power output terminal 25 via the Schottky diode 31 and the diode 32, respectively, of the input power sources.

The voltage produced at the power output terminal 25 by the main batteries 20 (power source) is lowered by the forward voltage drop (hereinafter represented by Vf) of the Schottky diode 31. Since Vf of the Schottky diode 31 is generally lower than or equal to 0.4 V, the reduction from the voltage of the main batteries 20 due to Vf is negligible. On the other hand, Vf of the diode 32 is generally as high as 0.7 V or more. However, by using a silicon diode whose reverse current is extremely small (1 μA or less), a reverse current flow from the main batteries 20 is prevented and reactive current loss with the main batteries 20 is thus prevented.

In the hybrid circuit 26, the voltage that appears on the side of the power output terminal 25 via the diode 32 having the auxiliary power circuit 21 as the input power source is made higher by a minimum voltage than the voltage that appears on the side of the power output terminal 25 via the Schottky diode 31 having the main batteries 20 as the input power source through the actions of the voltage comparison circuit 28, the power source control unit 23, etc. (described later in detail). The hybrid circuit 26 operates so as to supply power to the power output terminal 25 only from the auxiliary power circuit 21 as long as a sufficient amount of power is supplied from the auxiliary power circuit 21.

<Voltage Comparison Circuit>

The voltage comparison circuit 28 is a comparator (e.g., MAX919 produced by Maxim Integrated Products, Inc.) which compares two input voltages and outputs a predetermined value according to a comparison result. The voltage of the main batteries 20 is input to its positive (+) side input terminal and a voltage obtained from the electric double-layer energy storage device 24 and obtained via the offset diode 27 is input to its negative (−) side input terminal. That is, a voltage that is lower than the voltage of the electric double-layer energy storage device 24 by the voltage Vf of the offset diode 27 is input to the negative (−) side input terminal of the voltage comparison circuit 28.

By using, as the offset diode 27, a diode of such a type that it is the same or approximately the same in Vf as the diode 32, the voltage that appears on the side of the power output terminal 25 via the diode 32 is made approximately equal to the voltage that is input to the negative (−) side input terminal of the voltage comparison circuit 28 via the offset diode 27. That is, the offset diode 27 serves to maintain a state that the same voltage as the voltage that appears, in the hybrid circuit 26, on the side of the power output terminal 25 via the diode 32 having the auxiliary power circuit 21 as the input power source always appears at the negative (−) side input terminal of the voltage comparison circuit 28.

If the voltage at the negative (−) side input terminal of the voltage comparison circuit 28 is higher than the voltage at the positive (+) side input terminal of the voltage comparison circuit 28, the voltage comparison circuit 28 outputs an off signal of comparison result as a power supply on/off instruction to the power source control unit 23. On the other hand, if the voltage at the negative (−) side input terminal is the same as or lower than the voltage at the positive (+) side input terminal, the voltage comparison circuit 28 outputs an on signal of comparison result as an instruction to the power source control unit 23.

That is, the voltage comparison circuit 28 outputs an off signal as a power supply on/off instruction to the power source control unit 23 if the voltage produced with the auxiliary power circuit 21 as an input power source is higher than the voltage produced with the main batteries 20 as an input power source. If not, the voltage comparison circuit 28 outputs an on signal.

<Power Source Control Unit>

The power source control unit 23 is a switching regulator (e.g., TPS61200 produced by Texas Instruments Inc.) having a function of on/off-switching the supply of power. When receiving an on signal from the voltage comparison circuit 28, the power source control unit 23 sets itself in a power supply on state which is a state for receiving power from the auxiliary power circuit 21 by turning on a switch (not shown) provided in the switching regulator. When receiving an off signal from the voltage comparison circuit 28, the power source control unit 23 sets itself in a power supply off state which is a state that the supply of power from the auxiliary power circuit 21 is suspended by turning off the switch provided in the switching regulator. While being in the power supply on state, the power source control unit 23 supplies power from the auxiliary power circuit 21 to the electric double-layer energy storage device 24 and thereby charges the electric double-layer energy storage device 24. On the other hand, while being in the power supply off state, the power source control unit 23 does not supply power from the auxiliary power circuit 21 to the electric double-layer energy storage device 24.

<Interaction Between Voltage Comparison Circuit and Power Source Control Unit>

If the electric double-layer energy storage device 24 has been charged sufficiently being supplied with power from the auxiliary power circuit 21 in the power supply on state and the voltage at the negative (−) side input terminal of the voltage comparison circuit 28 has become higher than the voltage at its positive (+) side input terminal, the voltage comparison circuit 28 outputs an off signal of comparison result as a power supply on/off instruction to the power source control unit 23. Receiving the off signal from the voltage comparison circuit 28, the power source control unit 23 sets itself in the power supply off state which is a state that the supply of power from the auxiliary power circuit 21 is suspended and thereby suspends the supply of power to the electric double-layer energy storage device 24. That is, if the voltage of the electric double-layer energy storage device 24 minus the voltage Vf of the offset diode 27 has become higher than the voltage of the main batteries 20, the power source control unit 23 suspends the supply of power to the electric double-layer energy storage device 24.

After the suspension of the supply of power to the electric double-layer energy storage device 24, the voltage of the electric double-layer energy storage device 24 decreases as its power is consumed. However, while the voltage at the negative (−) side input terminal of the voltage comparison circuit 28 is higher than the voltage at its positive (+) side input terminal, the voltage comparison circuit 28 outputs an off signal to the power source control unit 23 and hence time elapses with the charging of the electric double-layer energy storage device 24 suspended.

If the voltage at the negative (−) side input terminal of the voltage comparison circuit 28 has become lower than or equal to the voltage at its positive (+) side input terminal, the voltage comparison circuit 28 outputs an on signal to the power source control unit 23 and hence the power source control unit 23 is rendered into the power supply on state. The power source control unit 23 again supplies power from the auxiliary power circuit 21 to the electric double-layer energy storage device 24 and thereby charges the electric double-layer energy storage device 24. This cycle is performed repeatedly.

While the above cycle is repeated, the state is maintained that the same voltage as the voltage that appears, in the hybrid circuit 26, on the side of the power output terminal 25 via the diode 32 having the auxiliary power circuit 21 as the input power source always appears at the negative (−) side input terminal of the voltage comparison circuit 28. That is, the voltage that appears on the side of the power output terminal 25 via the diode 32 having the auxiliary power circuit 21 as the input power source is higher by a minimum voltage than the voltage that appears on the side of the power output terminal 25 via the Schottky diode 31 having the main batteries 20 as the input power source. Therefore, the hybrid circuit 26 operates to supply power to the power output terminal 25 only from the auxiliary power circuit 21.

For example, if the voltages Vf of the Schottky diode 31 and the diode 32 are 0.4 V and 0.7 V; respectively, they have a difference of 0.3 V. As a result, the output voltage of the hybrid circuit 26 is slightly higher (in this example, by 0.3 V) than the voltage of the main batteries 20. Therefore, the voltage that appears at the power output terminal 25 can serve for supply of power with a small voltage variation in spite of the hybrid operation.

The power supply circuit according to the first embodiment of the present invention has a feature that with the hybrid circuit 26 the consumption of power supplied from the main batteries 20 is suppressed by the hybrid power supply (done all the time) with, a minimum voltage difference irrespective of the state of the voltage produced by the main batteries 20.

The electric double-layer energy storage device 24 operates most effectively when it is a device that can be charged and discharged rapidly. However, no differences occur in operation even if it is a common secondary battery for charging such as a lithium ion battery.

The power control circuit 19 is described above as being such that the offset diode 27 is provided to maintain the state that the same voltage as the voltage that appears, in the hybrid circuit 28, on the side of the power output terminal 25 via the diode 32 having the auxiliary power circuit 21 as the input power source always appears at the negative (−) side input terminal of the voltage comparison circuit 28. An alternative configuration is possible in which the offset diode 27 is omitted and comparison is made in the voltage comparison circuit 28 in such a manner that a difference corresponding to the offset diode 27 is taken into consideration. The omission of the offset diode 27 provides an advantage that the entire configuration is made simpler though the voltage comparison circuit 28 becomes complex. On the other hand, the use of the offset diode 27 provides an advantage that the configuration of the voltage comparison circuit 28 is simple.

After the electric double-layer energy storage device 24 has been charged sufficiently by the supply of power from the auxiliary power circuit 21 in the power supply on state, the hybrid circuit 26 operates so that power is supplied to the power output terminal 25 only from the electric double-layer energy storage device 24. Therefore, the above-described workings and advantage of the first embodiment of the present invention can be obtained by using the output voltage of the hybrid circuit 26 (i.e., the voltage fed from the electric double-layer energy storage device 24) as the voltage that is input to the negative (−) side input terminal of the voltage comparison circuit 28 instead of the voltage that is obtained from the electric double-layer energy storage device 24 via the offset diode 27.

The reason is as follows. Before the electric double-layer energy storage device 24 is charged sufficiently, the output voltage of the hybrid circuit 26 is equal to the voltage that is fed from the main batteries 20. However, because of the voltage drop Vf of the Schottky diode 31, the voltage at the negative (−) side input terminal of the voltage comparison circuit 28 is necessarily lower than the voltage at its positive (+) side input terminal. Since the voltage comparison circuit 28 outputs an on signal to the power source control unit 23, the power source control unit 23 is rendered in the power supply on state and hence the electric double-layer energy storage device 24 will be charged sufficiently. As a result, the hybrid circuit 26 causes only the electric double-layer energy storage device 24 to supply power to the power output terminal 25.

Using the output voltage of the hybrid circuit 26 (i.e., the voltage fed from the electric double-layer energy storage device 24) as the voltage that is input to the negative (−) side input terminal of the voltage comparison circuit 28 provides a great advantage that not only is the configuration of the voltage comparison circuit 28 made simpler but also the entire configuration becomes the simplest.

Figure 4:
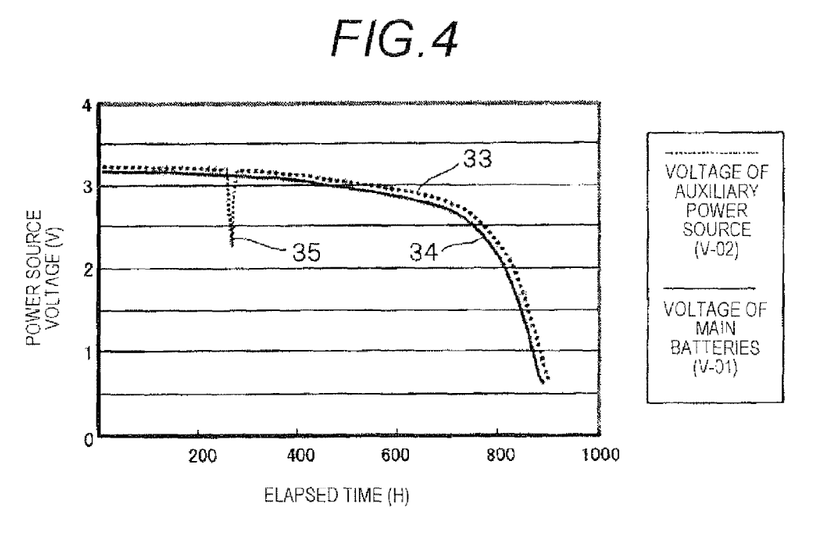
FIG. 4 is a discharge voltage graph showing example manners of variation of discharge voltages in the power supply system according to the first embodiment of the present invention.

FIG. 4 is a discharge voltage graph showing example manners of variation of discharge voltages in the power supply system according to the first embodiment of the present invention in the figure, the horizontal axis represents the discharge time (H) and the vertical axis represents the voltage (V). A discharge characteristic of the main batteries 20 is indicated by a solid line and a discharge characteristic of the auxiliary power circuit 21 obtained via the electric double-layer energy storage device 24 is indicated a dotted line, both are represented by actual measurement data.

As shown in FIG. 4, the power supply system operates in such a manner that the voltage 33 of the electric double-layer energy storage device 24 is always higher than the voltage 34 of the main batteries 20 in addition, because of the actions of the voltage comparison circuit 28, the power source control unit 23, etc. described above with reference to FIG. 3, the voltage 33 of the electric double-layer energy storage device 24 is kept slightly higher than the voltage 34 of the main batteries 20 while following the latter.

However, it cannot be avoided that if a cloudy weather as dark as in the nighttime continues and the electromotive force of the solar cell 10 is kept small, the lithium ion battery 30 is discharged to disable charging of the electric double-layer energy storage device 24. That is, like an exceptional voltage value 35 shown in FIG. 4, there occurs a time slot in which the voltage of the electric double-layer energy storage device 24 is lower than the voltage of the main batteries 20. However, even in such a case, by virtue of the feature of the first embodiment of the present invention that the voltage of the electric double-layer energy storage device 24 is kept slightly higher than the voltage 34 of the main batteries 20 while following the latter, the consumption of power supplied from the main batteries 20 is minimized and hence the period when the electromotive force of the solar cell 10 is small can be made shorter than in conventional systems. Therefore, a time slot in which the voltage of the electric double-layer energy storage device 24 is lower than the voltage of the main batteries 20 like the exceptional voltage value 35 is made shortest. Since the consumption of power supplied from the main batteries 20 is suppressed at the same time, the battery life of the main batteries 20 can be generally elongated.

Figure 5:
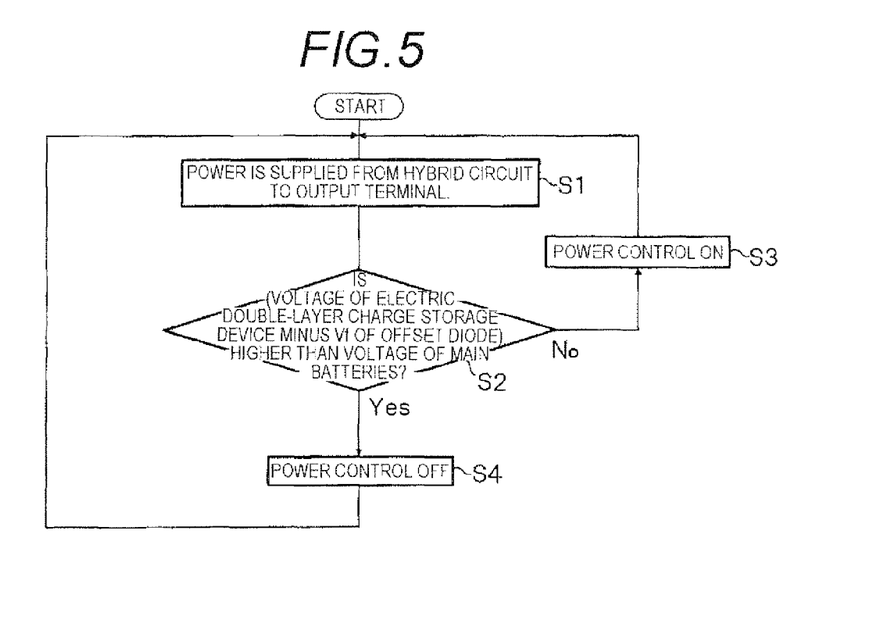
FIG. 5 is a flowchart showing an example of operations of the power control system according to the first embodiment of the present invention.

Next, how the power control system 22 operates will be described according to FIG. 5 with additional reference to FIG. 3. FIG. 5 is a flowchart showing an example of operation of the power control system 22 according to the first embodiment of the present invention.

First, the hybrid circuit 26, more specifically, the OR, circuit consisting of the Schottky diode 31 and the diode 32, outputs power to the power output terminal 25 from one, producing a higher one of the voltages appearing on the side of the power output terminal 25 via the Schottky diode 31 and the diode 32, respectively, of the input power sources (step S1). At the initial stage, power is supplied from the main batteries 20 to the power output terminal 25 because the voltage across the diode 32 is equal to zero.

Then, the voltage comparison circuit 28 compares the voltage that is input from the main batteries 20 to the positive (+) side input terminal with the voltage that is input to the negative (−) side input terminal via the offset diode 27 as a result of feeding of a voltage from the electric double-layer energy storage device 24 (step S2).

If it is determined at step S2 that the voltage value obtained by subtracting the voltage Vf of the offset diode 27 from the voltage of the electric double-layer energy storage device 24 is lower than or equal to the voltage of the main batteries 20, the voltage comparison circuit 28 outputs an on signal to the power source control unit 23, whereby the power source control unit 23 is rendered into the power supply on state (step S3). The electric double-layer energy storage device 24 starts to be charged receiving power from the auxiliary power circuit 21, and the voltage of the electric double-layer energy storage device 24 increases. And the process returns to step S1, where power is supplied to the power output terminal 25 from one, producing a higher voltage on the side of the power output terminal 25, of the input power sources.

On the other hand, if it is determined at step S2 that the voltage value obtained by subtracting the voltage Vf of the offset diode 27 from the voltage of the electric double-layer energy storage device 24 is higher than the voltage of the main batteries 20, the voltage comparison circuit 28 outputs an off signal to the power source control unit 23, whereby the power source control unit 23 is rendered into the power supply off state (step S4). Since the supply of power from the auxiliary power circuit 21 is suspended, the voltage of the electric double-layer energy storage device 24 decreases gradually as its power is consumed. And the process returns to step S1, where power is supplied to the power output terminal 25 from one, producing a higher voltage on the side of the power output terminal 25, of the input power sources.

Since the above-described, steps S1 to S4 are executed successively, after the electric double-layer energy storage device 24 has been charged sufficiently, the voltage of the electric double-layer energy storage device 24 is kept slightly higher than the voltage of the main batteries 20 while following the latter even if the voltage of the main batteries 20 fluctuates to some extent. Thus, power is supplied from the electric double-layer energy storage device 24 to the power output terminal 25.

The above steps are executed repeatedly in the form of an infinite loop. However, when the main batteries 20 is disconnected, the voltage of the electric double-layer energy storage device 24 becomes approximately equal to zero and hence the output of power from the hybrid circuit 26 can be stopped completely.

Figure 6:
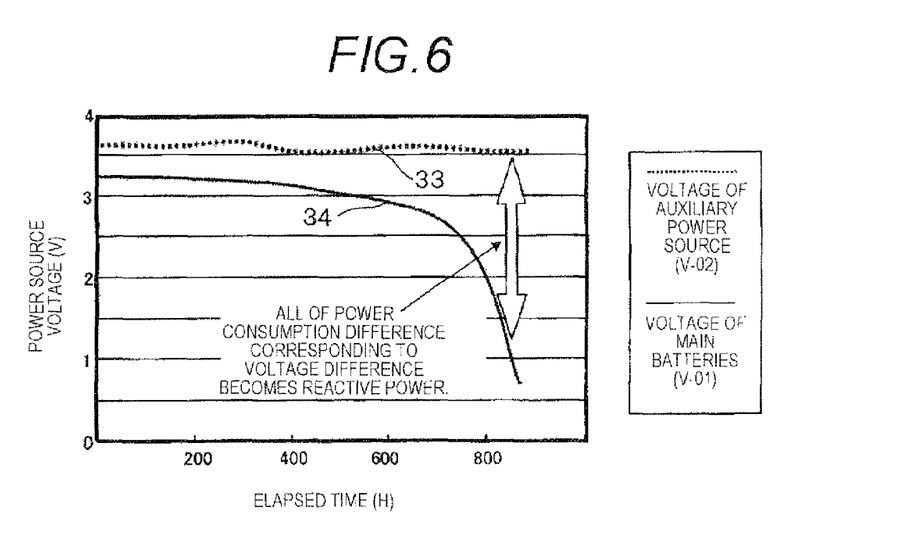
FIG. 6 is a discharge voltage graph showing example manners of variation of discharge voltages in a case that the power source control of the power control system according to the first embodiment of the present invention is not performed.

FIG. 6 is a discharge voltage graph showing example manners of variation of discharge voltages in a case that the power source control of the power control system according to the first embodiment of the present invention is not performed. The description of the same items described above with reference to FIG. 4, such as the horizontal axis and the vertical axis, will be omitted.

As shown in FIG. 6, even in the case where the power source control of the power control system according to the first embodiment of the present invention is not performed, a system operates in such a manner that the voltage 33 of the electric double-layer energy storage device 24 is always kept higher than the voltage 34 of the main batteries 20. However, since the voltage 33 of the electric double-layer energy storage device 24 does not follow the voltage 34 of the main batteries 20, the former is always kept higher than the latter in a state that it is approximately fixed at a constant voltage. And the voltage difference is kept high irrespective of the voltage of the main batteries.

That is, in a conventional power supply system that does not employ the power source control of the power control system according to the first embodiment of the present invention, to allow the hybrid circuit 26 to reliably supply power from the electric double-layer energy storage device 24 to the power output terminal 25, it is necessary to set the voltage of the electric double-layer energy storage device 24 higher than the entire assumed range of voltage produced by the main batteries 20. To this end, it is necessary that in the auxiliary power circuit 21 power generated by the solar cell 10 be stored in the lithium ion battery 30 and that power is supplied to the electric double-layer energy storage device 24 via the power source control unit 23 with the voltage fixed at a predetermined high voltage. As a result, power stored in the lithium ion battery 30 is consumed uselessly and the lithium ion battery 30 is exhausted faster. The area bounded by the curves of the voltages 33 and 34 in FIG. 6 corresponds to power that is consumed uselessly in the case where the power source control of the power control system according to the first embodiment of the present invention is not performed.

A simple measure for avoiding useless consumption of power stored in the lithium ion battery 30 of the auxiliary power circuit 21 is to set the voltage of the electric double-layer energy storage device 24 low. However, this increases the frequency of events that the voltage of the main batteries 20 becomes higher due to its fluctuations, as a result of which the main batteries 20 are used frequently and exhausted faster.

As such, the power source control of the power control system according to the first embodiment of the present invention makes it possible to prevent unnecessary consumption of power stored in the lithium ion battery 30 of the auxiliary power circuit 21 while suppressing the consumption of power supplied from the main batteries 20 more efficiently than in conventional power supply systems.

Embodiment 2

Figure 7:
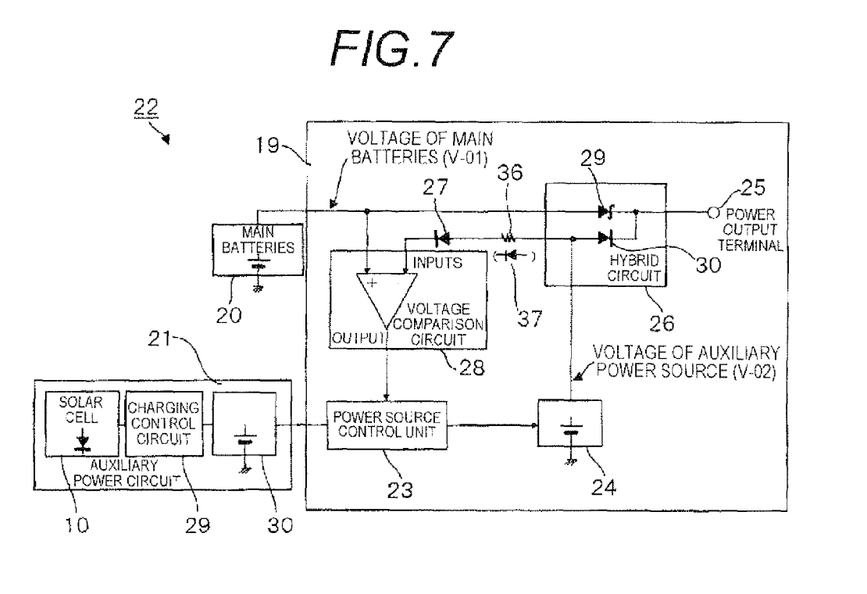
FIG. 7 is a block diagram showing an example hardware configuration of a power supply system according to a second embodiment of the present invention.

FIG. 7 is a block diagram showing an example hardware configuration of a power supply system according to a second embodiment of the present invention. This embodiment is the same in configuration as the first embodiment except for the addition of an offset resistor 36 or an offset diode 37 which can replace the offset resistor 36. Therefore, components having the same ones in the first embodiment are given the same reference numerals as the latter and descriptions therefor will be omitted.

The offset resistor 36 used in the second embodiment of the present invention is characterized in being connected to the offset diode 27 in series. In the first embodiment, if the current flowing through the diode 32 of the hybrid circuit 26 is much larger than the current flowing through the offset diode 27 (a case that though the offset diode 27 is of the same type as the diode 27, their diode characteristics are not identical or are different in the dependence on the environment (e.g., temperature)), they have different Vf values and hence the hybrid circuit 26 may not exercise its function sufficiently. In such a case, a consumption current also flows from the main batteries 20, resulting in a problem that the intended objective cannot be attained. In the second embodiment of the present invention, the offset resistor 36 is provided to solve this problem.

In the power supply system according to the second embodiment of the present invention, the offset resistor 3G acts to adds to Vf of the offset diode 27. That is, added with a voltage drop having a very small value due to a current flowing through the offset resistor 36, the voltage appearing at the power output terminal 25 can be made higher than in the first embodiment. With this action, a sufficient voltage difference can be secured between the main batteries 20 of the hybrid circuit 26 and the electric double-layer energy storage device 24 even if the diode characteristics are not identical or are different in the dependence on the environment (e.g., temperature).

Furthermore, even in the case where the voltage of the main batteries 20 fluctuates to a large extent and hence the hybrid circuit 26 cannot exercise its function sufficiently, that is, the frequency of events that the voltage of the main batteries 20 becomes higher than that of the electric double-layer energy storage device 24 is high and the consumption of power supplied from the main batteries 20 is large, by virtue of the addition of the offset resistor 36 such a voltage difference that the voltage of the electric double-layer energy storage device 24 is higher than that of the main batteries 20 can be secured. This assures stable operations of the power control circuit 19 and the power supply system 22.

The offset resistor 36 may be replaced with the offset diode 37 which is of the same type as the offset diode 27. That is, a predetermined voltage Vf may be secured by the series connection of the two offset diodes, that is, the offset diode 27 and the offset diode 37 which is of the same type as the offset diode 27.

Figure 8:
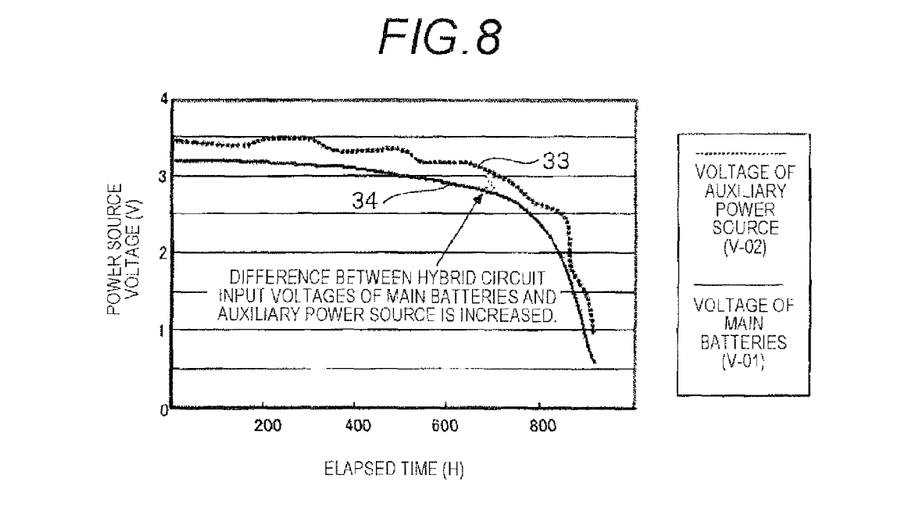
FIG. 8 is a discharge voltage graph showing example manners of variation of discharge voltages in the power supply system according to the second, embodiment of the present invention.

FIG. 8 is a discharge voltage graph showing example manners of variation of discharge voltages in the power supply system according to the second embodiment of the present invention. The description of the same items described above with reference to FIG. 4, such as the horizontal axis and the vertical axis, will be omitted.

The voltage 33 of the electric double-layer energy storage device 24 shown in FIG. 8 indicates voltage fluctuations that occur when the load current at the power output terminal 25 varies to a large extent. This embodiment is characterized in that the voltage of the electric double-layer energy storage device 24 does not become lower than that of the main batteries 20 because the difference between the input voltages of the hybrid circuit 26 is increased by means of the offset resistor 36, like the difference between the voltages 33 and 34.

Embodiment 3

Figure 9:
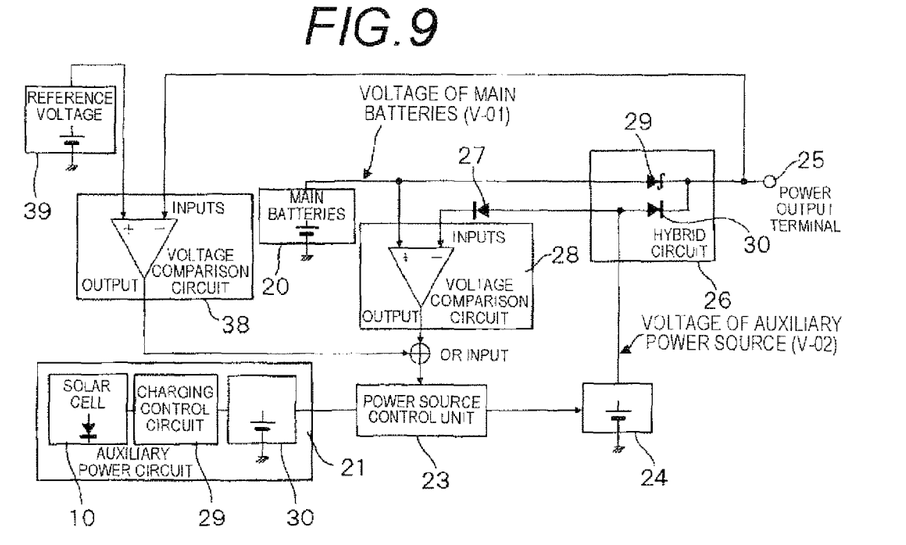
FIG. 9 is a block diagram showing an example hardware configuration of a power supply system according to a third embodiment of the present invention.

FIG. 9 is a block diagram showing an example hardware configuration of a power supply system according to a third embodiment of the present invention. This embodiment is the same in configuration as the first embodiment except for the addition of a voltage comparison circuit 38 and a reference voltage 39. Therefore, components having the same ones in the first embodiment are given the same reference numerals as the latter and descriptions therefor will be omitted.

The reference voltage 39 is input to the positive (+) side input terminal of the voltage comparison circuit 38 used in the embodiment inputs and the output voltage of the hybrid circuit 26 is input to its negative (−) side input terminal. The reference voltage 39 serves as a minimum voltage that is required at the power output terminal 25 (i.e., a minimum voltage that is necessary for operation of the load connected to the power output terminal 25) and is used by the voltage comparison circuit 38 to determine whether or not the output voltage of the hybrid circuit 26 is lower than the minimum voltage that is necessary for operation of the load. The output of the voltage comparison circuit 38 is logically added to the output of the voltage comparison circuit 28, and a result is input to the power source control unit 23.

As described later in detail, the voltage comparison circuit 38 receives the output voltage of the hybrid circuit 26 which is kept slightly higher than the voltage of the main batteries 20 while following the latter, and compares the received voltage with the reference voltage 39. If the voltage of the main batteries 20 has become a voltage that is lower than or equal to an assumed voltage, that is, the voltage of the reference voltage 39, and, with which the output voltage of the hybrid circuit 26 does not enable operation of the load, the voltage comparison circuit 38 forcibly suspends the following of the voltage of the main batteries 20 and keeps the voltage of the electric double-layer energy storage device 24 at a minimum value. Therefore, even after the main batteries 20 have been exhausted, power continues to be output to the power output terminal 25 at a minimum necessary voltage as long as the solar cell 10 produces an electromotive force.

Figure 10:
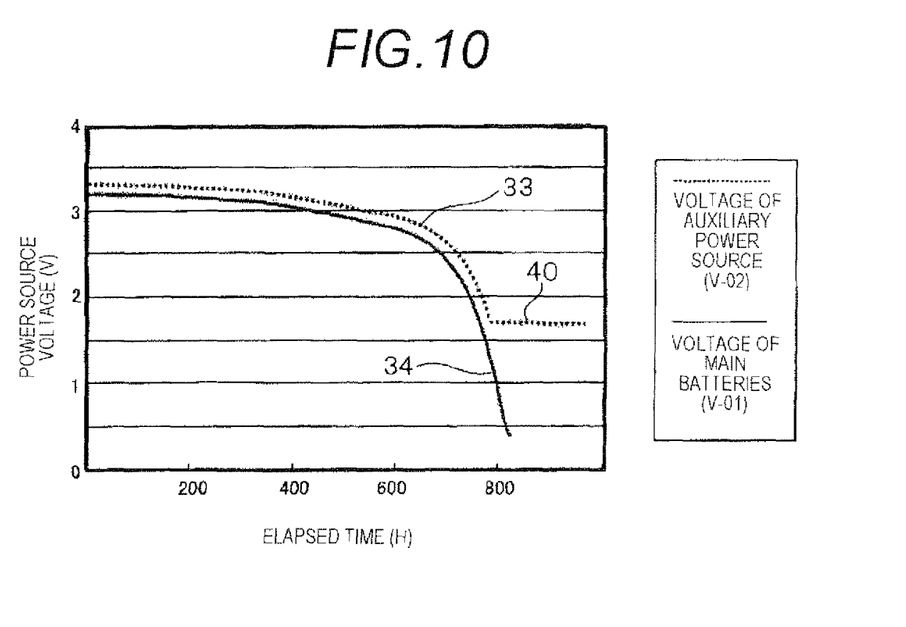
FIG. 10 is a discharge voltage graph showing example manners of variation of discharge voltages in the power supply system according to the third embodiment of the present invention.

FIG. 10 is a discharge voltage graph showing example manners of variation of discharge voltages in the power supply system according to the third embodiment of the present invention. The description of the same items described above with reference to FIG. 4, such as the horizontal axis and the vertical axis, will be omitted.

The voltage 33 of the electric double-layer energy storage device 24 varies while being kept slightly higher than the voltage 34 of the main batteries 20. When the main batteries 20 have been discharged over time and their voltage has reached the reference voltage 39, the following of the main batteries 20 is suspended and the voltage 33 of the electric double-layer energy storage device 24 comes to be equal to a minimum voltage 40 which is separated from the voltage 34 of the main batteries 20. That is, the voltage that appears at the power output terminal 25 as a result of feeding of a voltage from the electric double-layer energy storage device 24 via the diode 32 of the hybrid circuit 26 is kept at the minimum voltage while being detected.

Figure 11:
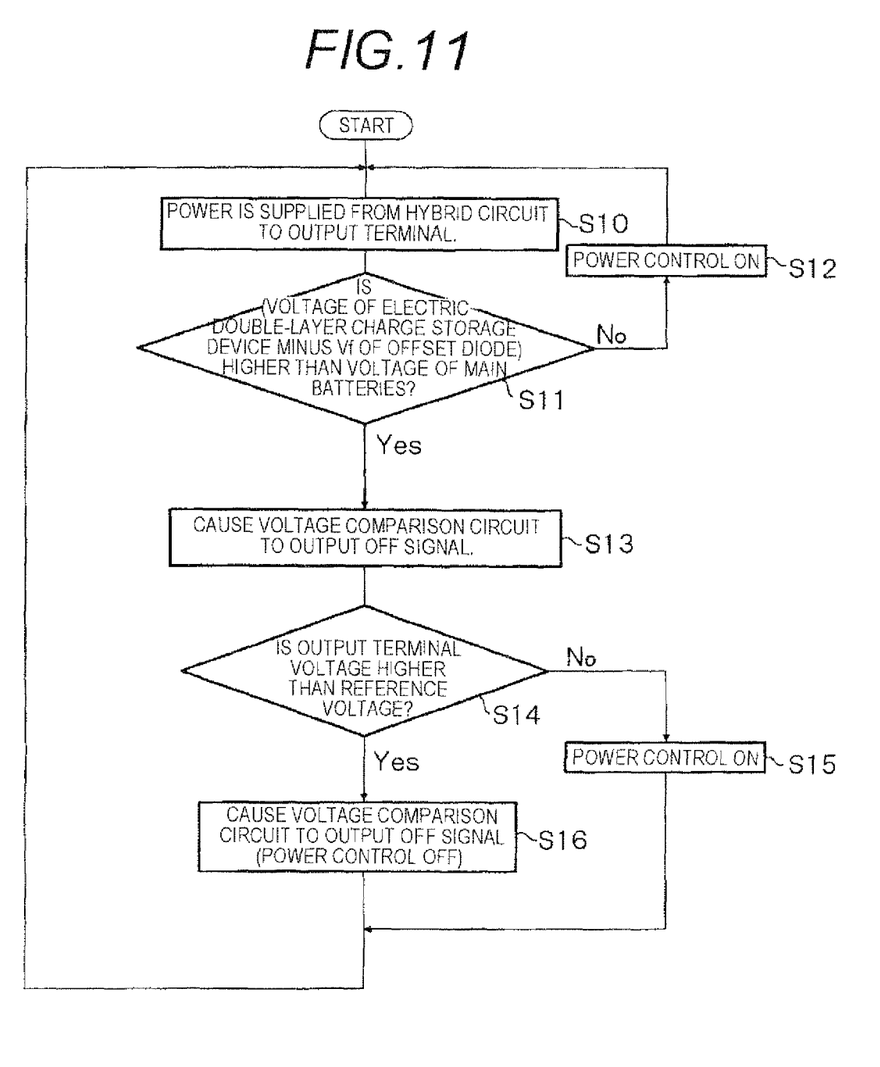
FIG. 11 is a flowchart showing an example of how the power control system according to the third embodiment of the present invention operates.

Next, how the power supply system operates will be described according to FIG. 11 with additional reference to FIG. 9. FIG. 11 is a flowchart showing an example of operation of the power control system according to the third embodiment of the present invention.

First, the hybrid circuit 26, more specifically, the OR circuit consisting of the Schottky diode 31 and the diode 32, outputs power to the power output terminal 25 from one, producing a higher one of the voltages appearing on the side of the power output terminal 25 via the Schottky diode 31 and the diode 32, respectively, of the input power sources (step S10). At the initial stage, power is supplied from the main batteries 20 to the power output terminal 25 because the voltage across the diode 32 is equal to zero.

Then, the voltage comparison circuit 28 compares the voltage that is input from the main batteries 20 to the positive (+) side input terminal with the voltage that is input to the negative (−) side input terminal via the offset diode 27 as a result of feeding of a voltage from the electric double-layer energy storage device 24 (step S11).

If it is determined at step S11 that the voltage value obtained by subtracting the voltage Vf of the offset diode 27 from the voltage of the electric double-layer energy storage device 24 is lower than or equal to the voltage of the main batteries 20, the voltage comparison circuit 28 outputs an on signal to the power source control unit 23, whereby the power source control unit 23 is rendered into the power supply on state because the output of the voltage comparison circuit 28 is logically added to the output of the voltage comparison circuit 38 (step S12). The electric double-layer energy storage device 24 starts to be charged after receiving power from the auxiliary power circuit 21, and the voltage of the electric double-layer energy storage device 24 increases. And the process returns to step S10, where power is supplied to the power output terminal 25 from one, producing a higher voltage on the side of the power output terminal 25, of the input power sources.

On the other hand, if it is determined at step S11 that the voltage value obtained, by subtracting the voltage Vf of the offset diode 27 from the voltage of the electric double-layer energy storage device 24 is higher than the voltage of the main batteries 20, the voltage comparison circuit 28 outputs an off signal to the power source control unit 23 (step S13). However, since the output of the voltage comparison circuit 28 is logically added to the output of the voltage comparison circuit 38, the resulting state of the power source control unit 23 depends on the output of the voltage comparison circuit 38.

Then, the voltage comparison circuit 38 compares the reference voltage 39 which is input to the positive (+) side input terminal with the output voltage of the hybrid circuit 26 which is input to the negative (−) side input terminal (step S14).

If it is determined at step S14 that the output voltage of the hybrid circuit 26 is lower than or equal to the reference voltage 39, the voltage comparison circuit 38 outputs an on signal to the power source control unit 23. Since the output of the voltage comparison circuit 38 is logically added to the output of the voltage comparison circuit 28, the power source control unit 23 is rendered into the power supply on state (step S15). The electric double-layer energy storage device 24 starts to be charged receiving power from the auxiliary power circuit 21, and the voltage of the electric double-layer energy storage device 24 increases. And the process returns to step S10, where power is supplied to the power output terminal 25 from one, producing a higher voltage on the side of the power output terminal 25, of the input power sources.

On the other hand, if it is determined at step S14 that the output voltage of the hybrid circuit 26 is higher than the reference voltage 39, the voltage comparison circuit 38 outputs an off signal to the power source control unit 23 (step S16). Since the output of the voltage comparison circuit 38 is logically added to the output (off signal) of the voltage comparison circuit 28, the power source control unit 23 is rendered into the power supply off state.

Since the supply of power from the auxiliary power circuit 21 is suspended, the voltage of the electric double-layer energy storage device 24 decreases gradually as its power is consumed. And the process returns to step S10, where power is supplied to the power output terminal 25 from one, producing a higher voltage on the side of the power output terminal 25, of the input power sources.

Since the above-described steps. S10 to S16 are executed successively, power is output from the electric double-layer energy storage device 24 to the power output terminal 25 so that the voltage of the electric double-layer energy storage device 24 is kept slightly higher than the voltage of the main batteries 20 while following the latter even if the voltage of the main batteries 20 fluctuates to some extent.

This embodiment provides an advantage that because of the presence of step S14 the voltage at the power output terminal 2 never becomes lower than the voltage of the reference voltage 39 which is set at a minimum voltage. For example, it can be assured that an apparatus, a device, or the like connected to the power output terminal 25 operates properly as long as the solar cell 10 continues to generate power even after the main batteries 20 are exhausted.

As described above, in the power supply circuit according to each of the first to third embodiments of the present invention, if the voltage of the electric double-layer energy storage device 24 is higher than that of the main batteries 20 because of supply of power from the auxiliary power circuit 21, the electric double-layer energy storage device 24, that is, the power source of the auxiliary power circuit 21, is selected and supply of power from the auxiliary power circuit 21 is suspended while the above condition is satisfied. Therefore, unnecessary consumption of power supplied from the auxiliary power source can be prevented while the consumption of power supplied from the main batteries is suppressed efficiently.

In the power supply circuit according to the second embodiment of the present invention, the employment of the offset resistor 36 makes it possible to secure a voltage difference so that the voltage of the electric double-layer energy storage device 24 is higher than that of the main batteries 20 in a case that the voltage of the main batteries 20 fluctuates to a large extent and hence the hybrid circuit 26 cannot exercise its function sufficiently though the auxiliary power circuit 21 can provide a sufficient amount of power, that is, the frequency of events that the voltage of the main batteries 20 becomes higher than that of the electric double-layer energy storage device 24 is high and the consumption of power supplied from the main batteries 20 is large. As a result, it can be assured that the power control circuit 19 and the power supply system 22 operate stably.

In the power supply circuit according to the third embodiment of the present invention, a minimum necessary voltage can be output to the power output terminal 25 as long as the auxiliary power circuit 21 can produce an electromotive force even in a case that the voltage of the main batteries 20 has become lower than or equal to the reference voltage.

In the power supply circuit according to each of the first to third embodiments of the present invention, where the solar cell 10 is used as the auxiliary power source, the consumption of power supplied from the secondary battery of the auxiliary power source can be suppressed to the limit even in the case where sunlight shines on the solar cell 10 only during a limited period because of the installation location of the apparatus. A stable operation is thus assured.

Furthermore, since the consumption of power supplied from the secondary battery is suppressed, power can be supplied to another apparatus if excess power exists. That is, where the solar cell 10 is installed independently, that is, separately from the entrance slave unit 12, as the solar cell device 11 in the manner shown in FIG. 1(b), wires can be extended from the solar cell device 11. Therefore, power can be easily supplied from the solar cell device 11 to another apparatus (not shown) in addition to the entrance slave unit 12. Naturally, it is also possible to supply power to another apparatus via wires from the entrance slave unit 1 which is installed in the form shown in FIG. 1(a).

Since the consumption of power supplied from the secondary battery is suppressed, over discharge of the secondary battery can be prevented. This means an advantage that the battery life of the secondary battery can be elongated.

Although in each of the first to third embodiments of the present invention the lithium ion battery 30 is provided on the side of the auxiliary power circuit 21, it may be provided on the side of the power control circuit 19 so as to be connected between the auxiliary power circuit 21 and the power source control unit 23. In this case, excess power stored in the lithium ion battery 30 can be used as one output from the power control circuit 19. Furthermore, although in each of the first to third embodiments of the present invention the main batteries 20 are primary batteries such as alkaline batteries, such a power source as a DC power source may be used as the main battery in place of the main batteries 20. In this case, unnecessary consumption of power supplied from the auxiliary power source can be prevented while the consumption of power supplied from the DC power source or the like which is the main power source can be suppressed efficiently.

The present invention expects that those skilled in the art will make various modifications and applications on the basis of the disclosure of the specification and known techniques without departing from the spirit and scope of the present invention, and such modifications and applications are included in the scope of protection. Furthermore, constituent elements of some of the embodiments may be combined arbitrarily without departing from the spirit of the present invention.

INDUSTRIAL APPLICABILITY

The present invention is useful when applied to a power supply circuit, a power supply method, and a power supply system which can prevent unnecessary consumption of power supplied from an auxiliary power source while suppressing the consumption of power supplied from a main power source efficiently.

REFERENCE SIGNS LIST

1: Entrance slave unit
2: Intercom master unit
3: Visitor
4: Resident
5: Call button
6: Camera
7: Speaker
8: Display unit
9: Conversation button
10: Solar cell
11: Solar cell device
12: Entrance slave unit
13: Control unit
14: Camera input unit
15: Microphone
16: Speaker
17: Call detection unit
18: Radio unit
19: Power supply circuit
20: Main batteries
21: Auxiliary power circuit
22: Power supply system
23: Power source control unit
24: Electric double-layer energy storage device
25: Power output terminal
26: Hybrid circuit
27: Offset diode
28: Voltage comparison circuit
29: Charging control circuit
30: Lithium ion battery
31: Schottky diode
32: Diode
33, 34: Voltage value
35: Exceptional voltage value
36: Offset resistor
37: Offset diode
38: Voltage comparison circuit
39: Reference voltage
40: Minimum voltage value

The invention claimed is:

1. A power supply circuit which supplies power to a load from a main power source or an auxiliary power source, the power supply circuit comprising:
    an energy storage unit that stores power that is supplied from the auxiliary power source;
    a hybrid selection unit that elects one of the main power source and the auxiliary power source and supplies power to the load from the selected one;
    a first voltage comparing unit that compares a voltage of the main power source and a voltage of the auxiliary power source;
    a power source control unit that controls the auxiliary power source in accordance with a comparison result of the voltage comparing unit, and supplies a voltage higher than the voltage of the main power source by a predetermined voltage to the load from the auxiliary power source through the hybrid selection unit;
    a reference voltage unit that holds a minimum voltage that is necessary for the load; and
    another voltage comparing unit that compares a power source voltage selected by the hybrid selection unit with the voltage of the reference voltage unit, wherein:
    the power source control unit suspends supply of power from the auxiliary power source during a period when the first voltage comparing unit determines that the voltage of the auxiliary power source is higher than the voltage of the main power source by a predetermined voltage or more and the another voltage comparing unit determines that the selected power source voltage is higher than the voltage of the reference voltage unit.

2. The power supply circuit according to claim 1, wherein the main power source is a battery.

3. The power supply circuit according to claim 1, wherein The first voltage comparing unit compares the voltage of the main power source and the voltage of the energy storage unit successively.

4. The power supply circuit according to claim 1, wherein the hybrid selection unit selects one, having a higher voltage, of the main power source and the energy storage unit, and supplies power to the load from the selected one.

5. The power supply circuit according to claim 1, wherein the power source control unit suspends supply of power from the auxiliary power source to the energy storage unit during a period when the voltage comparing unit determines that the voltage of the energy storage unit is higher than the voltage of the main power source by a predetermined voltage or more.

6. The power supply circuit according to claim 1, wherein a second energy storage unit is provided in a wiring line which connects the auxiliary power source and the power source control unit, the second energy storage unit being provided for storing power to be supplied from the auxiliary power source to the energy storage unit.

7. The power supply circuit according to claim 1, wherein a resistor unit is provided in a wiring line which connects the first voltage comparing unit and the energy storage unit, the resistor unit having a predetermined resistance for securing a voltage difference between the voltage of the main power source and the voltage of the energy storage unit which are compared by the first voltage comparing unit.

8. The power supply circuit according to claim 1, wherein the hybrid selection unit supplies power to the load from the auxiliary power source when the power source control unit can supply the voltage higher than the voltage of the main power source by the predetermined voltage.

9. The power supply circuit according to claim 8, further comprising
an energy storage unit for storing power that is supplied from the auxiliary power source and outputting the stored power to the hybrid selection unit, wherein
the power source control unit controls power supply from the auxiliary power source to the energy storage unit in accordance with the comparison result of the first voltage comparing unit.

10. A power supply method for supplying power to a load from a main power source or an auxiliary power source, the power supply method comprising:

a selection step of selecting one of the main power source and the auxiliary power source and supplying power to the load from the selected one;

a voltage comparing step of comparing a voltage of the main power source and a voltage of the auxiliary power source;

a power source control step of controlling the auxiliary power source in accordance with a comparison result of the voltage comparing step and supplying a voltage higher than the voltage of the main power source by a predetermined voltage to the load from the auxiliary power source;

a reference voltage step of holding a reference voltage that is a minimum voltage that is necessary for the load; and another voltage comparing step of comparing the power supplied by the selected one of the main power source and the auxiliary power source with the reference voltage, wherein:

the power source control step includes suspending supply of power from the auxiliary power source during a period when the first voltage comparing step determines that the voltage of the auxiliary power source is higher than the voltage of the main power source by a predetermined voltage or more and the another voltage comparing step determines that the selected power source voltage is higher than the reference voltage.

11. The power supply method according to claim 10, wherein
the selection step supplies power to the load from the auxiliary power source when the power source control step can supply the voltage higher than the voltage of the main power source by the predetermined voltage.

12. The power supply method according to claim 11, further comprising:
a charge storage step of storing power that is supplied from the auxiliary power source and outputting the stored power in the hybrid selection unit, wherein
the power source control step controls power supply from the auxiliary power source in the charge storage step in accordance with the comparison result of the first voltage comparing step.

* * * * *